Figure 8:
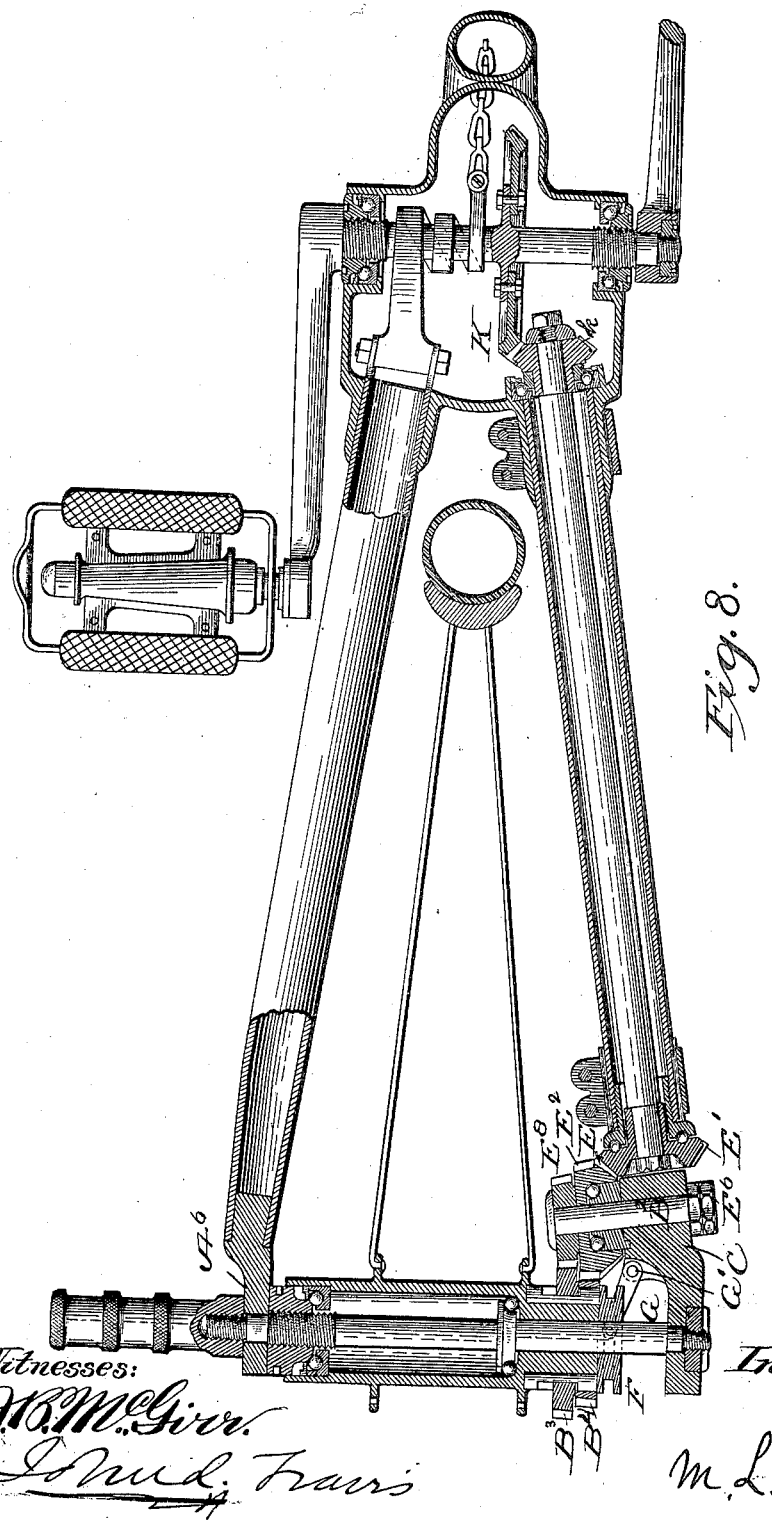

No. 679,283. Patented July 23, 1901.
M. L. NICHOLS.
BICYCLE DRIVING MECHANISM.
(Application filed Apr. 22, 1897.)
(No Model.) 8 Sheets—Sheet 1.
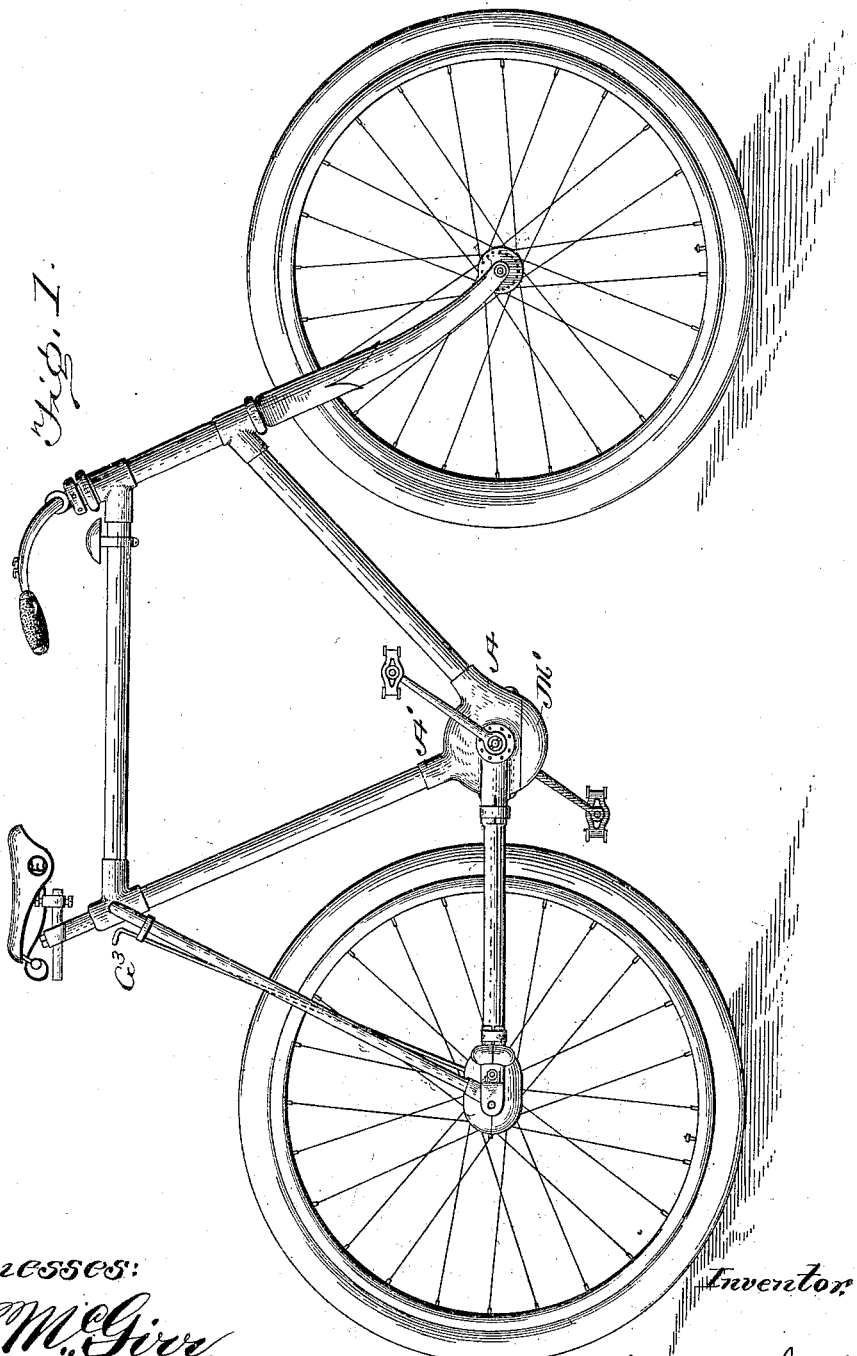

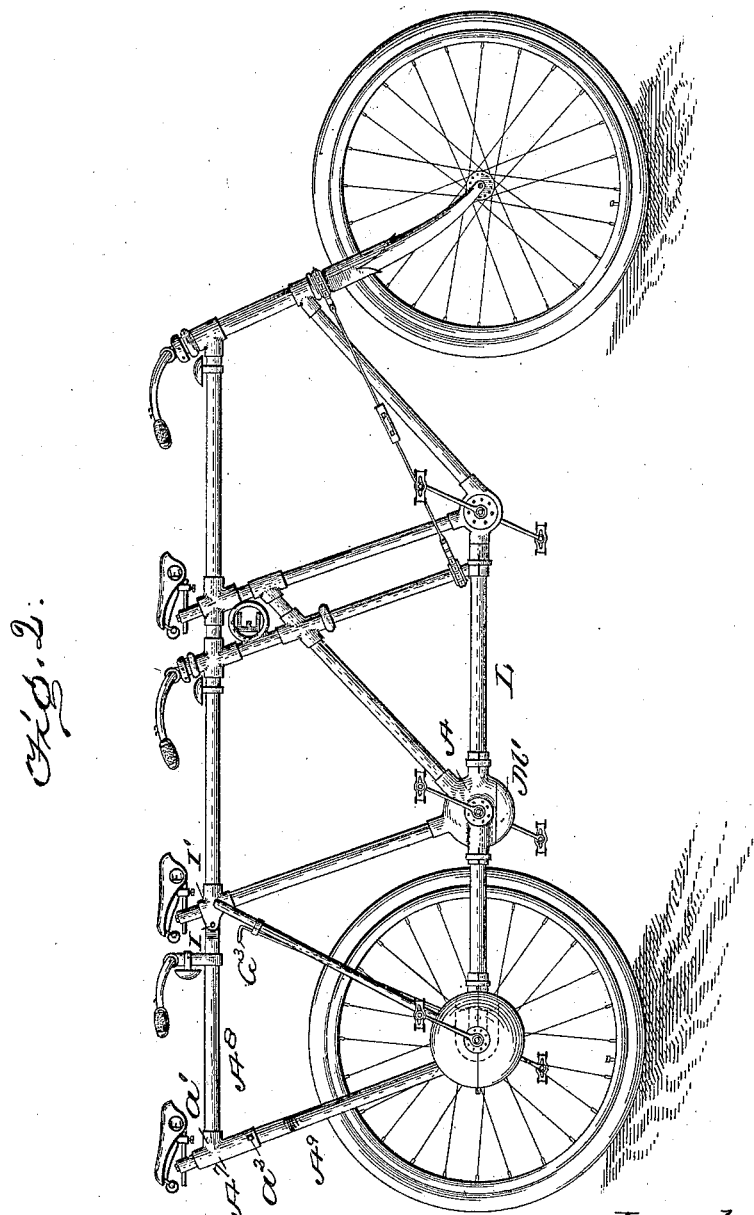

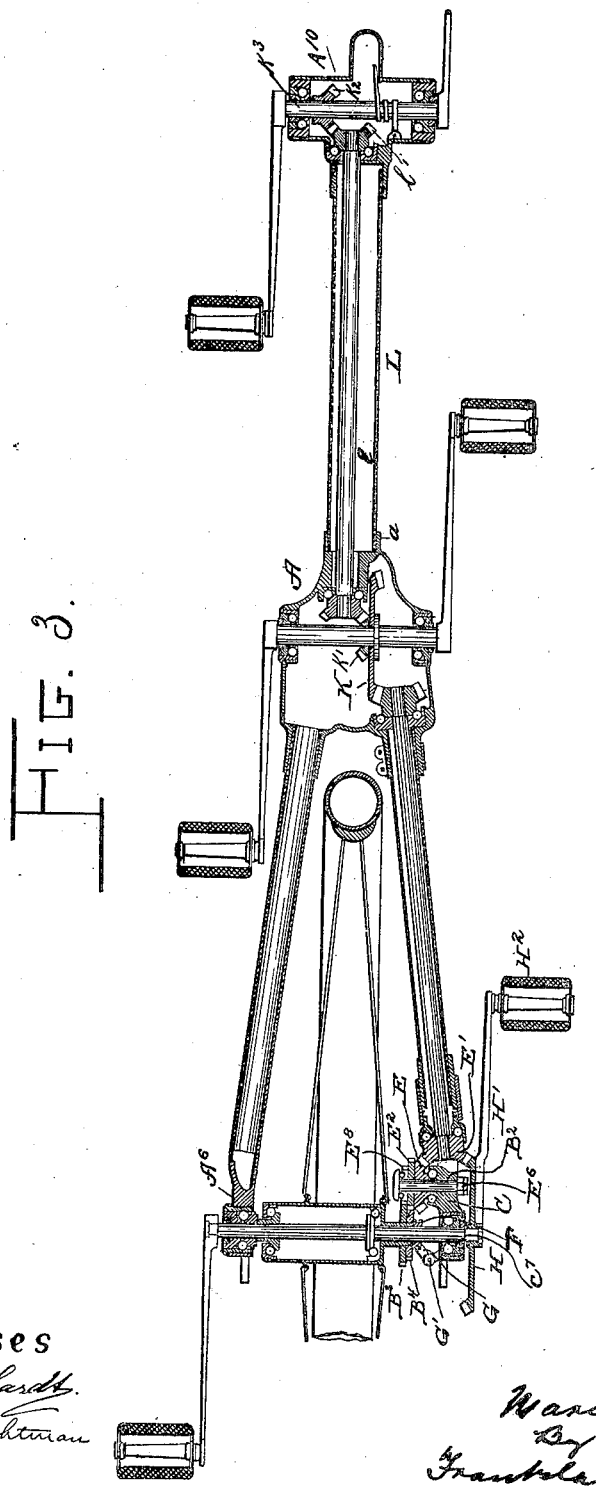

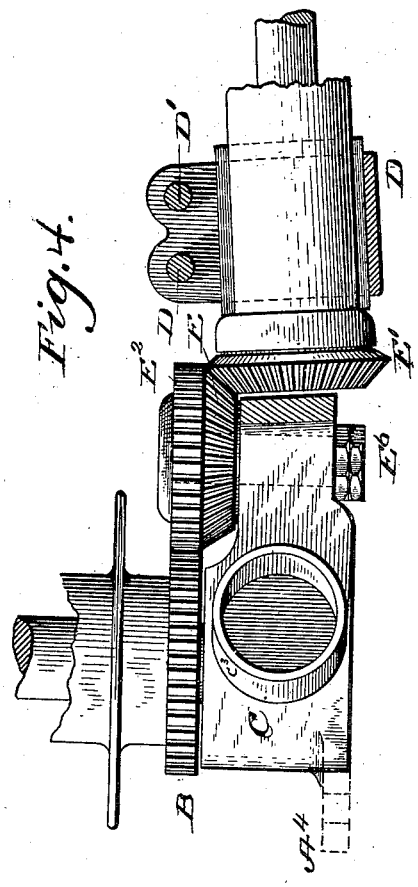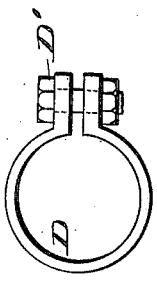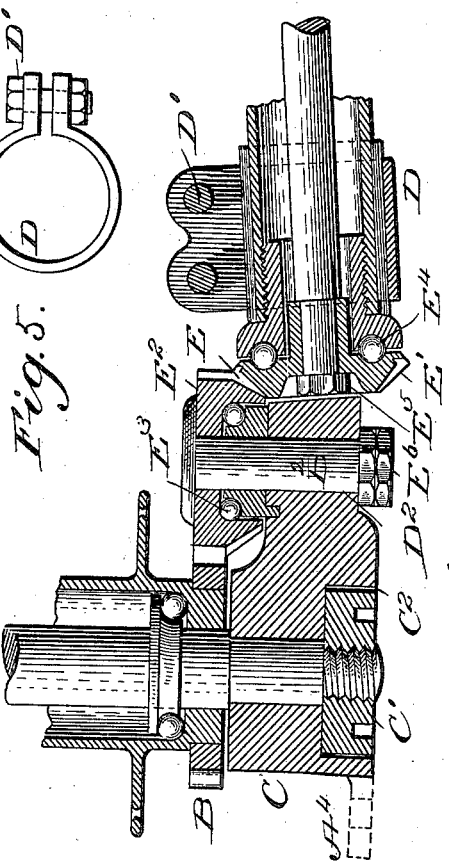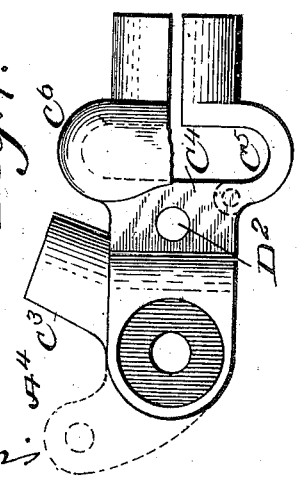

No. 679,283. Patented July 23, 1901.
M. L. NICHOLS.
BICYCLE DRIVING MECHANISM.
(Application filed Apr. 22, 1897.)
(No Model.)

8 Sheets—Sheet 5.

Witnesses:

Inventor:
M. L. Nichols

No. 679,283. Patented July 23, 1901.
M. L. NICHOLS.
BICYCLE DRIVING MECHANISM.
(Application filed Apr. 22, 1897.)
(No Model.) 8 Sheets—Sheet 6.

Witnesses:

Inventor:
M. L. Nichols

No. 679,283. Patented July 23, 1901.
M. L. NICHOLS.
BICYCLE DRIVING MECHANISM.
(Application filed Apr. 22, 1897.)
(No Model.) 8 Sheets—Sheet 7.
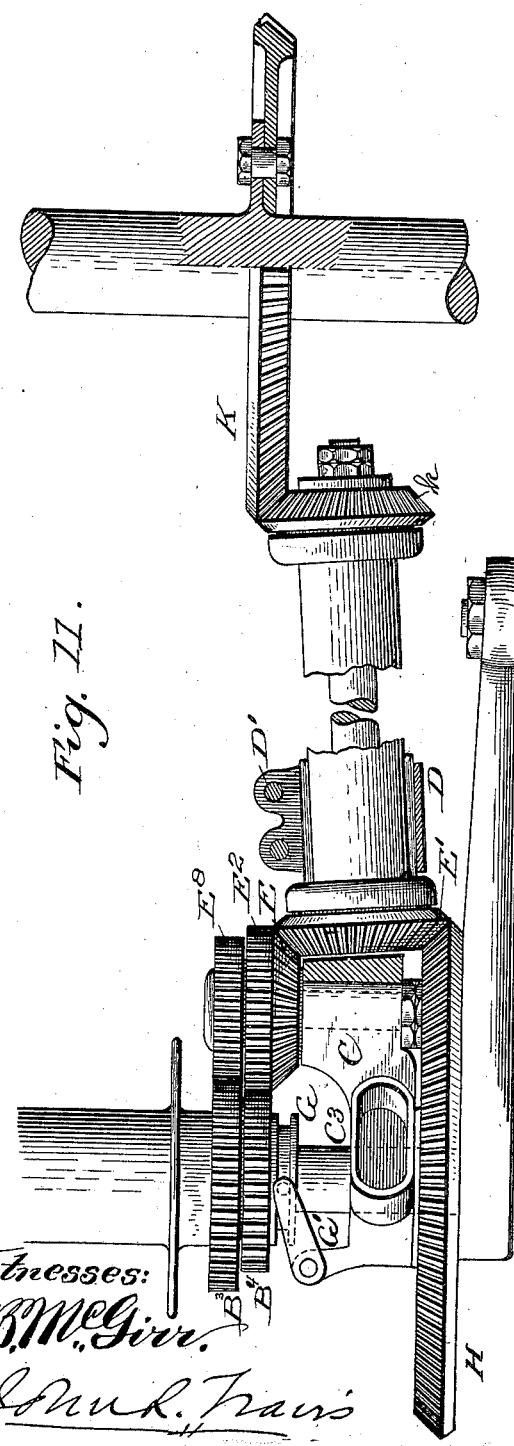
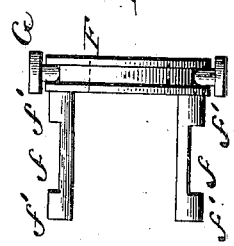
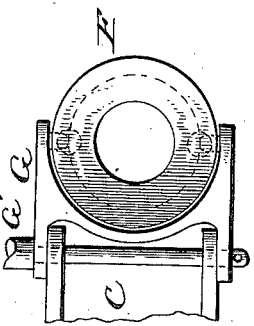
Witnesses:
J.B. McGirr.
John R. Travis
Inventor.
M. L. Nichols

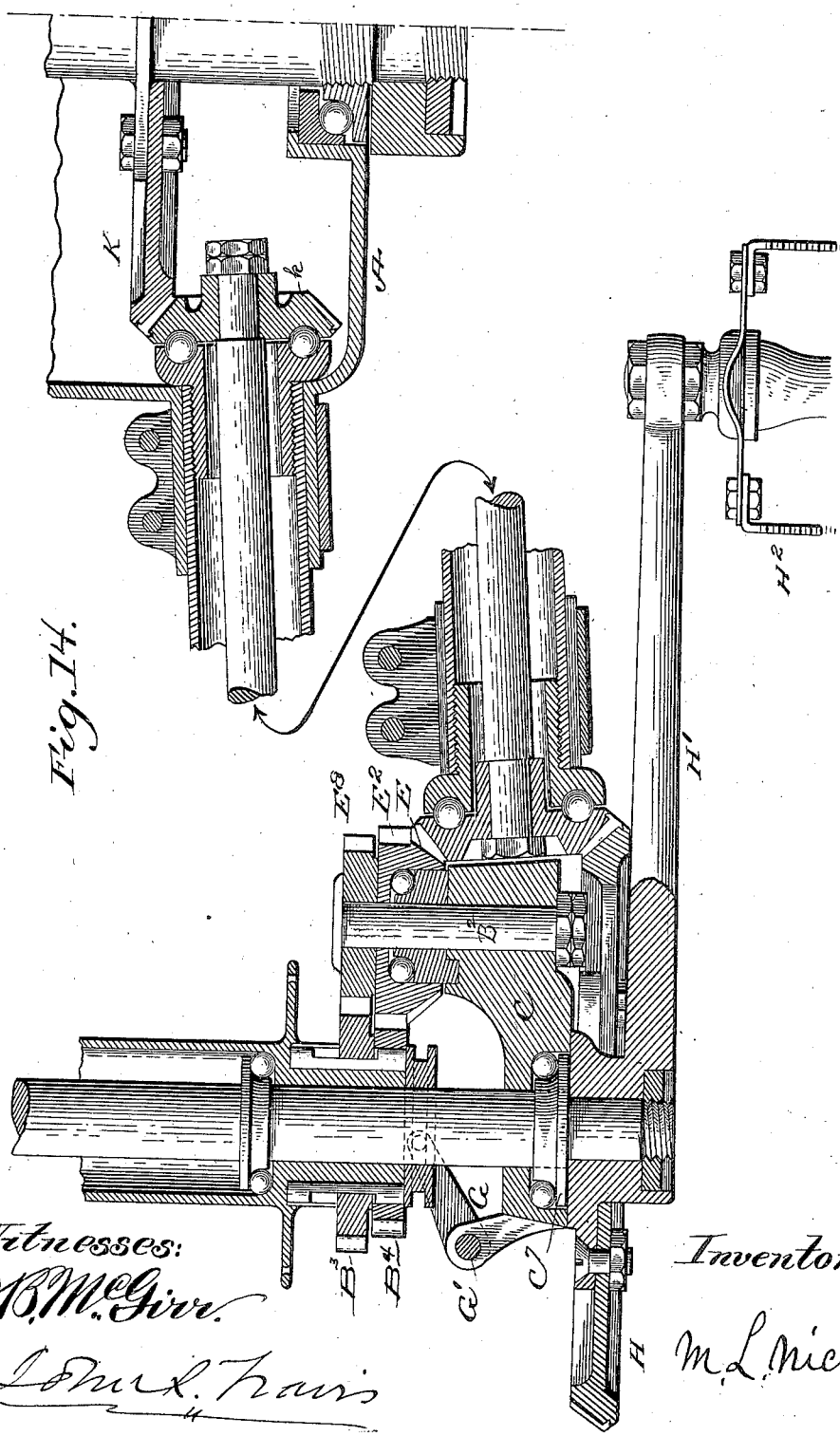

UNITED STATES PATENT OFFICE.

MARION L. NICHOLS, OF WESTFIELD, NEW JERSEY, ASSIGNOR TO THE EVOLUTION CYCLE COMPANY, OF WASHINGTON, DISTRICT OF COLUMBIA.

BICYCLE DRIVING MECHANISM.

SPECIFICATION forming part of Letters Patent No. 679,283, dated July 23, 1901.

Application filed April 22, 1897. Serial No. 633,388. (No model.)

*To all whom it may concern:*

Be it known that I, MARION L. NICHOLS, a citizen of the United States, residing at Westfield, in the county of Union and State of New Jersey, have invented certain new and useful Improvements in Bicycle Driving Mechanism; and I do hereby declare the following to be a full, clear, and exact description of the invention, such as will enable others skilled in the art to which it appertains to make and use the same.

My invention relates to that class of bicycles employing gears for transmitting motion from the pedal-shaft to the driven wheel or wheels, and has for its object to bring the parts into compact form and into such position that the gearing shall work more nearly in line and also permit the use of smaller gears and providing better and more symmetrical lines and also to make the parts interchangeable either in constructing a straight, tandem, or triplet machine or a machine convertible one into the other, or a single or changeable speed gear.

My invention consists, first, in a novel construction and arrangement of gearing operating in such manner that motion is communicated to the driven axle in front of such axle from the communicating shaft while maintaining the location of the driving-gear about centrally between the bearings of the main pedal-shaft.

It further consists in so constructing the parts that the same gears are adapted for use either in a single, tandem, or triplet or further extension of machine.

It further consists in a novel construction of detachable frame and gearing, whereby the machine may be converted from a single into a tandem at will, or vice versa.

It further consists in a novel construction of changeable-speed gearing and in locating said gear adjacent to the driven wheel and to certain novel features in the construction, combination, and arrangement of parts, all as hereinafter explained.

Figure 9:
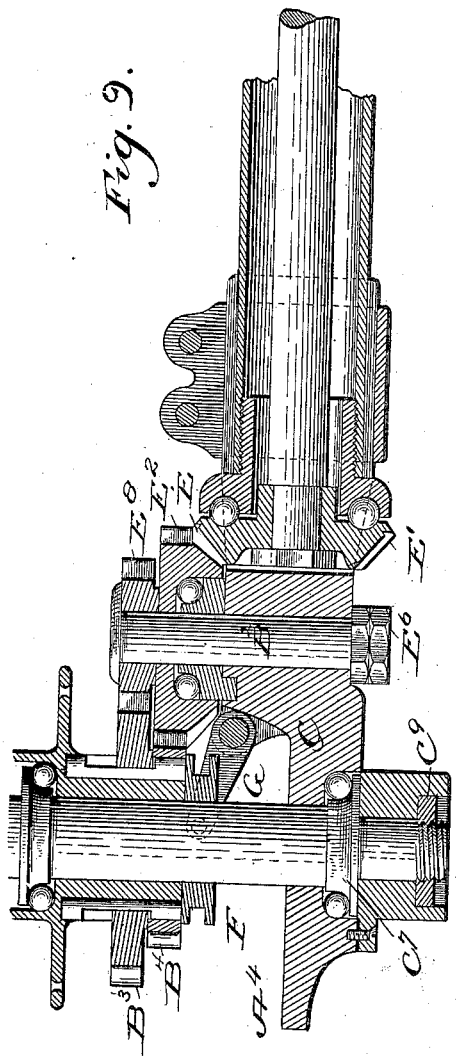
Figure 10:
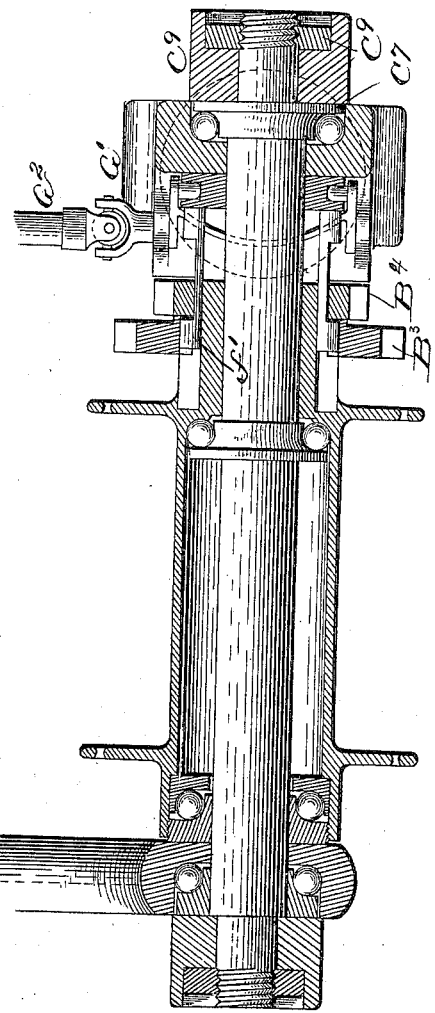

In the accompanying drawings, Figure 1 is a side elevation of a straight man's machine, showing my improved center bracket and the means for inclosing the gears adjacent to the axle, also showing one means for shifting the changeable-speed gear. Fig. 2 is a side elevation of a tandem machine, showing the same converted into a triplet. Fig. 3 is a longitudinal sectional plan view showing the driving apparatus of the machine illustrated in Fig. 2. Fig. 4 is a plan or top view of a section of the rear axle and the rear end of the connecting-shaft, showing the bracket forming the support for the gearing partly in section, also the clamp by which the connection between the tubing and bracket is made, also showing the gear on the hub of the driven wheel, the bevel-gear on the connecting-shaft, and the intermediate gears or idlers through which motion is communicated from the connecting-shaft to the drive-wheel, also showing the socket formed therein for the upright frame-brace, also the lug by which to attach the extra seat support or standard when the machine is converted into a tandem. Fig. 5 is an end view of the clamp. Fig. 6 is a sectional view of Fig. 4. Fig. 7 is a side elevation of the bracket forming the support for the gearing with the hinged lower section to permit the engagement of the same with the tubing of the connecting-shaft. Fig. 8 is a sectional view through the center bracket, rear axle, and connecting-tubing, and the train of gears, showing the changeable-speed gearing with the connecting bracket or support for the changeable-speed gear as constructed for a straight machine. Fig. 9 is a section similar to Fig. 6, but showing the changeable-speed gear and the means for shifting the gears, with the supporting-bracket for the changeable-speed gear fitted with the ball-races and the parts adapted for a convertible machine. Fig. 10 is a section through the rear or driven wheel hub, showing the axle or pedal-shaft, also showing the shifting device for the changeable-speed gearing and the lower end of the shifting-rod and the means for connecting the same with the shifting-gear. Fig. 11 is a plan or top view of the changeable-speed gearing complete when particularly adapted to a straight tandem with the shifting mechanism arranged in rear of the driven-wheel axle. Fig. 12 is an end view of the shifting mechanism as shown in Fig. 11. Fig. 13 is a side elevation of the same. Fig. 14 is a sectional view of the gearing as shown in Fig. 11.

In describing the machine it will first be explained as particularly adapted for a straight single machine, either man's or woman's, and in which a center bracket A is employed similar to that described and claimed in my Patent No. 600,482, dated March 8, 1898, except that in this case the center bracket is shown cast or stamped in two sections and united together, provided also, as in the patent, with sockets A' for the different frame-tubings necessary for a man's or woman's machine. This straight machine is illustrated in Figs. 1, 4, 6, and 7, in which the hub of the driven wheel has mounted thereon a gear-wheel B, rigidly connected thereto, and the axle has mounted thereon a bracket C, secured to the axle by means of a nut C' fitting in a recess $C^2$, formed in said bracket, so as to bring the face of the nut flush with the face of the bracket. A socket $C^3$ is formed in the bracket to receive the end of the rear supporting-frame tubing, and the bracket is provided with a forward extension $C^4$, with a lower hinged portion $C^5$, one portion of the extension constructed in such manner as to form a casing $C^6$ for the bevel-pinion on the end of the connecting-shaft, while the forward portion forms the socket for the reception of the rear end of the lower frame-tubing, said parts being secured together by means of a split spring clamp or collar D and bolts D'. A bearing $D^2$ is formed in the bracket for a stud-bolt or axle $B^2$, which axle has mounted thereon a double gear, one of which, E, is engaged by the gear E' on the connecting-shaft, while the other, $E^2$, engages the gear B on the wheel-hub, suitable ball-races $E^3$ $E^4$ for such gears being employed in the case of the connecting-shaft, the ball race or cup being screwed into the end of the tubing, while the cone is formed in the rear face of the gear E', the gear being provided with a collar fitting the shaft and the gear being secured thereto and the balls held in proper position by means of a nut $E^5$, while the race for the intermediate or double pinion is formed by mounting the cone on the shaft and engaging it with the bracket and with the cup formed in the gear, the axle for the gears being secured to the bracket and the parts held in proper position by means of a lock-nut $E^6$. By this construction and arrangement of gearing it will be seen that the gearing is located in front of the drive-wheel axle, and as a consequence can be brought in close to the frame, also allow the maintaining of the driving-gear about centrally between the bearings on the pedal-shaft, making the machine more compact in form and provide better and more symmetrical lines than where the connecting-shaft is carried beyond the axle or the transmitting-gear on the pedal-shaft is thrown to one side.

In Fig. 8 the same arrangement is shown for a straight changeable-speed machine, in which case two gears $B^3$ $B^4$ of unequal diameter are loosely mounted on the hub of the drive-wheel and the shaft $B^2$ has mounted thereon a compound wheel having three separate faces E $E^2$ $E^8$, the faces $E^2$ $E^8$ meshing with the wheels $B^3$ $B^4$ and act to cause either one of said faces $E^2$ $E^8$ to communicate motion from the transmitting-shaft to the hub of the drive-wheel through either of said wheels $B^3$ $B^4$, according as one or the other is engaged with the hub by the shifting mechanism hereinafter described. The other, while also receiving motion from the compound wheel, is permitted to run freely and by the arrangement above described to change the speed of the machine at will or throw the same entirely out of action, if found desirable. A shifting-collar F is mounted on the axle and has two round rods or arms F' extending out therefrom, which arms have one-half of the central portion cut away, as shown at $f$, leaving it the full diameter near each end, as shown at $f'$, or of a width corresponding to the width of the gear-wheel. These arms fit in grooves formed in the hub and act by the engagement of either of the ends $f'$ with either of the gears to hold it engaged with the shaft, while permitting the other to run loosely, or by bringing the cut-away portion directly in line with the two wheels to permit them both to run freely without communicating motion to the hub or throwing the gear entirely out of action. A shifting-fork G is pivotally mounted in the bracket C with the pin on the ends of the arms to engage the groove of the shifting-collar similar to devices of such character now in general use. The fork is rigidly connected to the pivotal shaft G', the upper end of which shaft is connected through a universal joint with a shifting-rod $G^2$, extending up to within reach of the rider's seat and provided at its upper end with a handle $G^3$.

When the device is used in a changeable-speed single or combination wheel, the fork is pivoted in front of the axle, as shown in Figs. 8, 9, and 10; but where the machine is used as a straight tandem the shifting-fork is pivoted in rear of the axle, as shown in Figs. 3, 11, and 14. In the last-named figures the machine is shown as constructed for a straight tandem, in which case the axle extends out beyond the face of the bracket C and has mounted thereon a gear-wheel H to mesh with the pinion or gear E' on the connecting-shaft, and to the outer face of the gear H is attached one of the extra cranks and pedals H' $H^2$, the other crank being mounted on the opposite end of the shaft, both sets of pedals working in unison, one pair acting on one end of the transmitting-shaft and the other on the opposite end.

Where the machine is constructed for a changeable speed, the socket $C^3$ is made in elongated form instead of round, so as to provide for the proper working of the shifting mechanism between the gears and the bracket.

The gearing for the single-speed machine is shown in Figs. 4, 6, and 7, being also adapted to be converted into a tandem by the addition of the lug $A^4$, as shown in dotted lines in said figures.

In the convertible machine, either single or changeable speed, the axle is provided with a ball-bearing cone $C^7$, which fits a recess similar to the recess $C^2$; but in this case the recess forms the ball race or socket.

To provide the extra seat and handle-bar in converting the machine from a single to a tandem, a lug I is formed with or otherwise attached to the sleeve I' at the upper end of the seat-post and a lug, similar to the lug $A^4$, is formed on the extension $A^6$ of the opposite side bar. A socket $A^7$ for the seat has forked or bifurcated arms $A^9$ extending down therefrom, and the lower end of each arm is provided with a flattened perforated extension $a$, by which to connect said ends with the lugs $A^4$ $A^5$. A second socket $a'$ is formed with the socket $A^7$, to which a frame-tubing or connecting-bar $A^8$ is connected, which bar is provided at its forward end with a flattened perforated extension by which to connect it with the lug I, and to this tubing or bar the handle-bar for the extra seat is connected. The forked or bifurcated arm $A^9$ is preferably connected to the seat-socket by means of a bolt $a^2$ to permit the arms to be disconnected therefrom and folded with the bar or tubing $A^8$ into compact form when not in use.

All the different arrangements of gearing are driven from a bevel-pinion K, mounted on the pedal-shaft which engages a bevel-pinion $k$ on the end of the transmitting-shaft, as particularly shown in Fig. 8, and when the machine is to be converted into a triplet this bevel-pinion is provided with a double face, as shown at K K', Fig. 3, one to engage the pinion on the transmitting-shaft and the other a pinion on a shaft $l$, mounted in the forwardly-extending tubing L, having a pinion $l'$ to be engaged by a bevel-pinion $K^2$ on the forward crank-shaft $K^3$ and constructed in such manner that the three sets of pedals and gears shall act in unison. In this case the forward portion of the frame is constructed similar to a straight tandem, except that the center bracket A has a forwardly-extending socket $a$, to which the tubing L is connected, which tubing extends forward and is connected to the casing inclosing the gear on the forward pedal-shaft, the rear extension for the seat being the same as in a convertible tandem and the general design being similar to a combination of a straight tandem in front and a convertible tandem in rear, all starting from the bracket A as a central point.

The machine shown in Figs. 2 and 3 may be used as a tandem, in which event the rear cranks and the auxiliary gear-wheel H are removed, together with the additional seat, handle-bars, and the portion of the frame connected therewith. The casing $A^{10}$, containing the driving mechanism for the shaft $l$, will be hereinafter referred to as the "forward casing." The bracket or casing A, located at the center of the machine, is designated the "main" or "intermediate" and the gear connections contained therein as the "intermediate driving-gear," while the rear shaft is referred to as such and the cranks H' and gear H are termed the "auxiliary." The center bracket is provided with an opening for the insertion of the gears which is closed by a cover M'.

While I have described the mechanism which is shown as illustrating my invention in terms applicable to the illustration, it must be understood that various minor modifications and changes may be made by persons skilled in the art in view of said showing and of the foregoing description without departing from the invention.

Having now described my invention, what I claim as new, and desire to secure by Letters Patent, is—

1. In a bicycle, the combination with a crank-shaft, of a gear-wheel rigidly mounted on said shaft and located about midway between the bearings thereof, a transmitting-shaft mounted in the tubular frame, a bevel-gear mounted at the forward end of said shaft and meshing on its inner side with said gear on said crank-shaft, a bracket secured to the rear end of the tubing in which said transmitting-shaft is mounted, a spindle mounted in said bracket, a combined spur and bevel gear mounted on said spindle, a bevel-gear mounted on the rear end of said transmitting-shaft and meshing on its inner side with the bevel portion of said combined gear, a gear mounted on the hub, of the rear wheel and meshing with the spur portion of said combined gear, substantially as described.

2. In a bicycle, the combination with a crank-shaft, of a gear-wheel rigidly mounted on said shaft and located about midway between the bearings thereof, a transmitting-shaft mounted in the tubular frame, a bevel-gear mounted at the forward end of said shaft and meshing with said gear on said crank-shaft, a bracket connected to the lower fork and rear brace in which said transmitting-shaft is mounted, and engaging the axle of the rear wheel, a spindle mounted in said bracket, a combined spur and bevel gear mounted on said spindle, a spur-gear also mounted on said spindle, the said gears carried by the said spindle being located in front of and in the same horizontal plane with said hub, a bevel-gear mounted on the rear end of said transmitting-shaft and meshing with the bevel portion of the said combined gear, gears mounted on the hub of the driven wheel, and means for throwing said gears in or out of action with said hub, substantially as described.

3. The combination in a bicycle adapted to be used as a tandem, of a pedal-shaft and driving-gear thereon, a transmitting-shaft having gears at each end and extending through the side frame-tube, a rear bracket connected at its forward end to the rear end of the said frame-tube, and adapted to contain the driving connections between the rear end of the transmitting-shaft and the hub of the driven wheel, and provided with suitable bearings therefor, and additional bearings within which the axle of the driven wheel is rotatably mounted, one of said bearings being upon and also forming the rearmost support of the bracket.

4. The combination in a bicycle adapted to be used as a tandem, of a pedal-shaft and driving-gear thereon, a transmitting-shaft having a pinion at each end, one of said pinions engaging the drive-gear on the pedal-shaft, said shaft extending through the side frame-tube, a rear bracket formed to inclose the gear on the rear end of said transmitting-shaft and rigidly connected to the rear end of the frame-tube, geared connections between the pinion on the rear end of the transmitting-shaft and gearing upon the hub of the driven wheel, and bearings in the outer portion of the bracket and in the opposite portion of the frame adapted to sustain the axle of the driven wheel, and to form the rearmost support of the bracket, said axle being thereby permitted to rotate independently of its hub while supporting the same, removable auxiliary cranks, and a drive-gear adapted to be secured upon said axle and to also mesh with the gear-pinion on the transmitting-shaft, to supply additional power thereto.

5. In a bicycle adapted to be used as a tandem, a transmitting-shaft adapted to be rotated from the pedal-shaft, a bracket supported on the axle of the driven wheel, and secured to the frame-tubing carrying the transmitting-shaft, an axle or stud-bolt mounted in said bracket, a double gear-wheel mounted on said axle, one of which meshes with a gear to rotate the driven wheel and the other with the rear gear on the transmitting-shaft, and a detachable gear engaged by auxiliary cranks and pedals, adapted to also engage the rear gear on the transmitting-shaft.

6. In a bicycle adapted to be used as a tandem, a pedal-shaft, a transmitting-shaft having a gear at each end, gears of unequal diameters mounted loosely on the hub of the drive-wheel and means for mechanically connecting either of said gears with said hub at will, an axle or stud-bolt arranged intermediate between the gear on the hub and transmitting-shaft carrying gears of unequal diameters, and adapted to have motion imparted thereto by the transmitting-shaft, an auxiliary gear meshing with the rear gear on the transmitting-shaft, and auxiliary cranks and pedals adapted to engage and rotate the auxiliary gear.

7. In a tandem bicycle the combination with the forward pedal-shaft, a rigidly-connected driving-gear thereon, the main or intermediate pedal-shaft and a double driving-gear thereon, a transmitting-shaft geared to the front and main driving-gears, a second transmitting-shaft extending rearward through the side frame-tube and provided with pinions at each end, one of said pinions engaging the driving-gear on the main pedal-shaft, driving-gear upon the hub of the rear or drive wheel, a rear bracket formed to inclose the gear on the rear end of said transmitting-shaft and rigidly connected at its forward end to the rear end of the frame-tube inclosing the rear transmitting-shaft, geared connections between the pinion on the rear end of the transmitting-shaft and the gearing upon the hub of the driven wheel, and separate bearings mounted upon the bracket, for sustaining the intermediate gears between the transmitting-shaft and the gearing upon the hub of the driven wheel.

8. The combination in a convertible tandem-bicycle, of a forward pedal-shaft having a driving-gear thereon, a main or intermediate pedal-shaft also provided with rigidly-connected driving-gear, a transmitting-shaft having a pinion at each end connecting the forward and main pedal-gears, a transmitting-shaft extending rearwardly through the side frame-tube and geared at one end to the main or intermediate pedal-gear, gearing upon the hub of the rear or driven wheel for driving the same, a bracket rigidly connected at its forward end to the rear end of the frame-tube inclosing the transmitting-shaft, intermediate gearing forward of the rear hub and connecting the gearing on said hub with the rear pinion upon the transmitting-shaft, bearings upon the bracket for supporting said intermediate gearing, an independently-rotatable axle extending through the hub of the driven wheel, an additional bearing in the outer portion of the bracket and in the corresponding opposite portion of the frame adapted to sustain the axle of the driven wheel and to form the rearmost support of the bracket, auxiliary cranks for the axle of the driven wheel, and a drive-gear also adapted to be secured upon said axle to mesh with the rear pinion of the transmitting-shaft to impart additional power thereto.

9. In a bicycle (or other vehicle) a pedal or driving shaft carrying a gear rigidly connected thereto, and inclosed in a center bracket or container having bearings for said shaft and a transmitting-shaft, and also connections for the converging frame-tubes, a transmitting-shaft, a cross-shaft intermediate between the gear on said transmitting-shaft and the hub of the driven wheel of the vehicle, the cross-shaft carrying wheels of different diameters, gears of different diameters loosely mounted on the hub of the driven wheel adapted to mesh with the gears upon the cross-shaft, a sliding clutch mounted upon the hub of said driven wheel adapted to rigidly connect either of the gears mounted upon said hub or release both at will, and means for sliding or shifting said clutch to engage or release said gears, a bracket or hollow container having bearings in one part for the transmitting-shaft, the cross-shaft and the hub of the driven wheel, substantially as described.

In testimony whereof I affix my signature in presence of two witnesses.

MARION L. NICHOLS.

Witnesses:
ALEX. MAHON,
O. M. BALL.